Feb. 19, 1952 P. L. NEWBOLD 2,586,557
SACKING AND WEIGHING MACHINE
Filed Dec. 6, 1948 4 Sheets-Sheet 1

INVENTOR.
Parker L. Newbold

Feb. 19, 1952     P. L. NEWBOLD     2,586,557
SACKING AND WEIGHING MACHINE
Filed Dec. 6, 1948     4 Sheets-Sheet 2
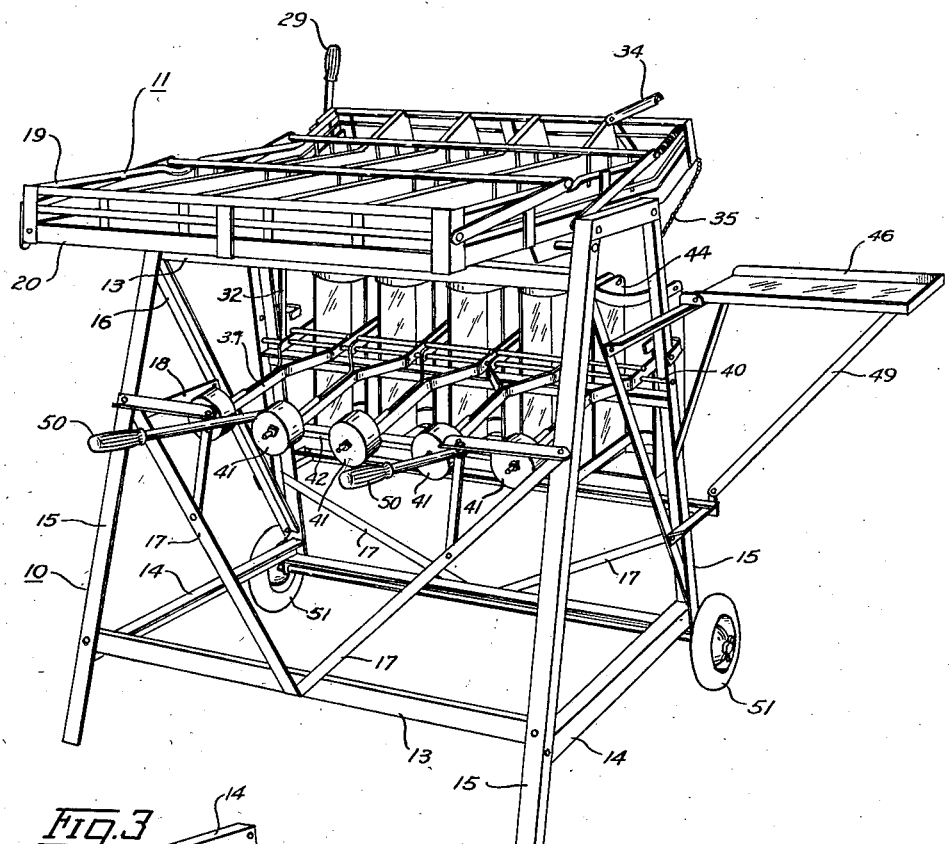
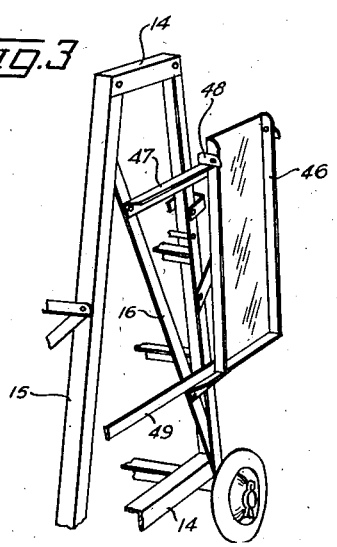
INVENTOR.

Feb. 19, 1952     P. L. NEWBOLD     2,586,557
SACKING AND WEIGHING MACHINE
Filed Dec. 6, 1948     4 Sheets-Sheet 3

INVENTOR.

Feb. 19, 1952     P. L. NEWBOLD     2,586,557
SACKING AND WEIGHING MACHINE

Filed Dec. 6, 1948     4 Sheets-Sheet 4

INVENTOR.

Patented Feb. 19, 1952

2,586,557

UNITED STATES PATENT OFFICE 2,586,557

SACKING AND WEIGHING MACHINE

Park L. Newbold, Cedar Rapids, Iowa

Application December 6, 1948, Serial No. 63,779

2 Claims. (Cl. 226—59)

This invention relates to a device for a sacking and weighing machine or other purposes to which it may be adapted.

It is the object of my invention to provide a device of simple and inexpensive construction so that the work required in placing potatoes in bags of size suitable for sale to the consumer may be lessened and thereby cost of distribution reduced.

Another object of my invention is to provide a machine that the approximate amounts of potatoes to be sacked are predetermined by sight and that automatically indicates when the desired weight has entered the bags.

Another object of my invention is to provide a device so constructed that a number of bags may be filled with one operation and that is easy to operate.

Another object of my invention is to provide a machine that may be easily moved from place to place as required.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

Figure 2 is a perspective rear view showing the hopper in up position and illustrating the weight control members.

Figure 3 is a detailed view of the bag platform in down position.

Figures 1, 7:
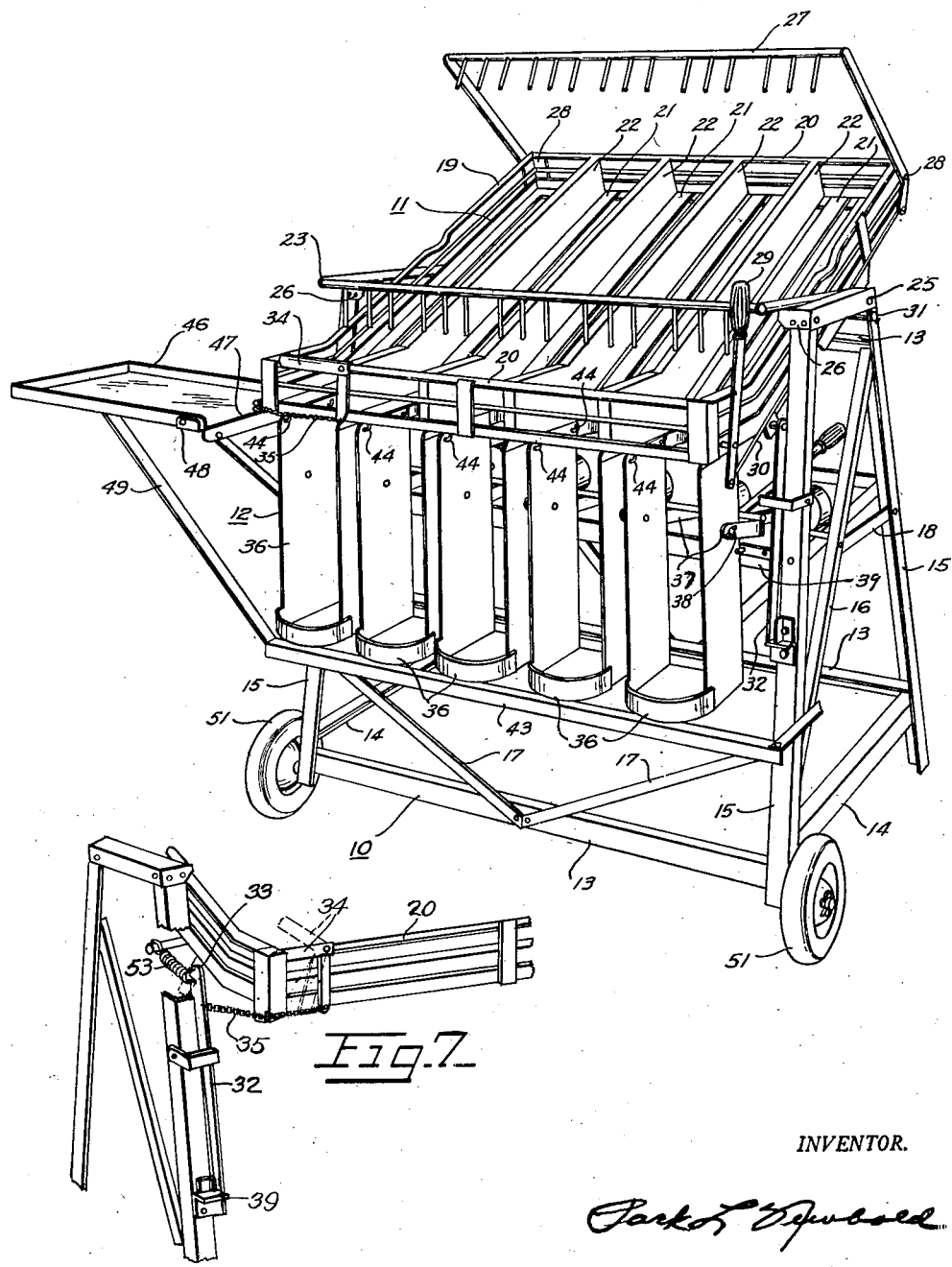
Figure 1 is a perspective view of the machine when viewed from the front and shows in particular the bag holding members, the tilting hopper and controlling members.
Figure 7 is a view of the unlatching mechanism controlling the movement of the hopper.
Figure 4:
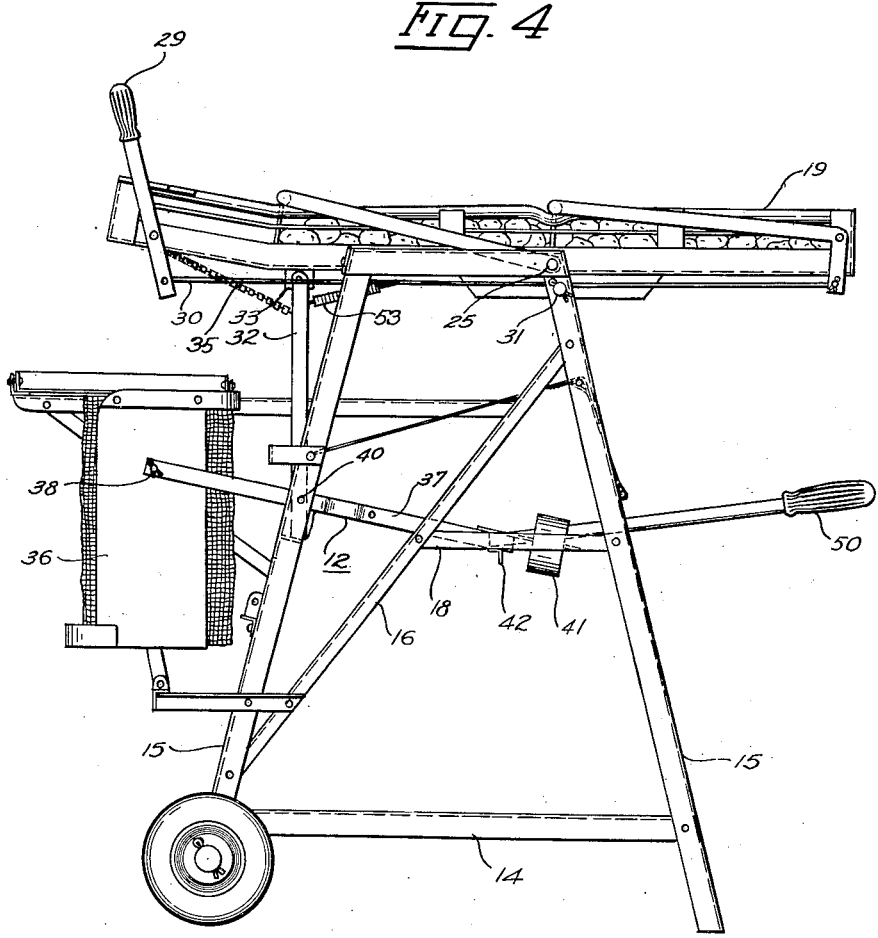
Figure 4 is a side view showing the hopper in up position and its relation to the bag holding and weighing assembly.
Figure 5:
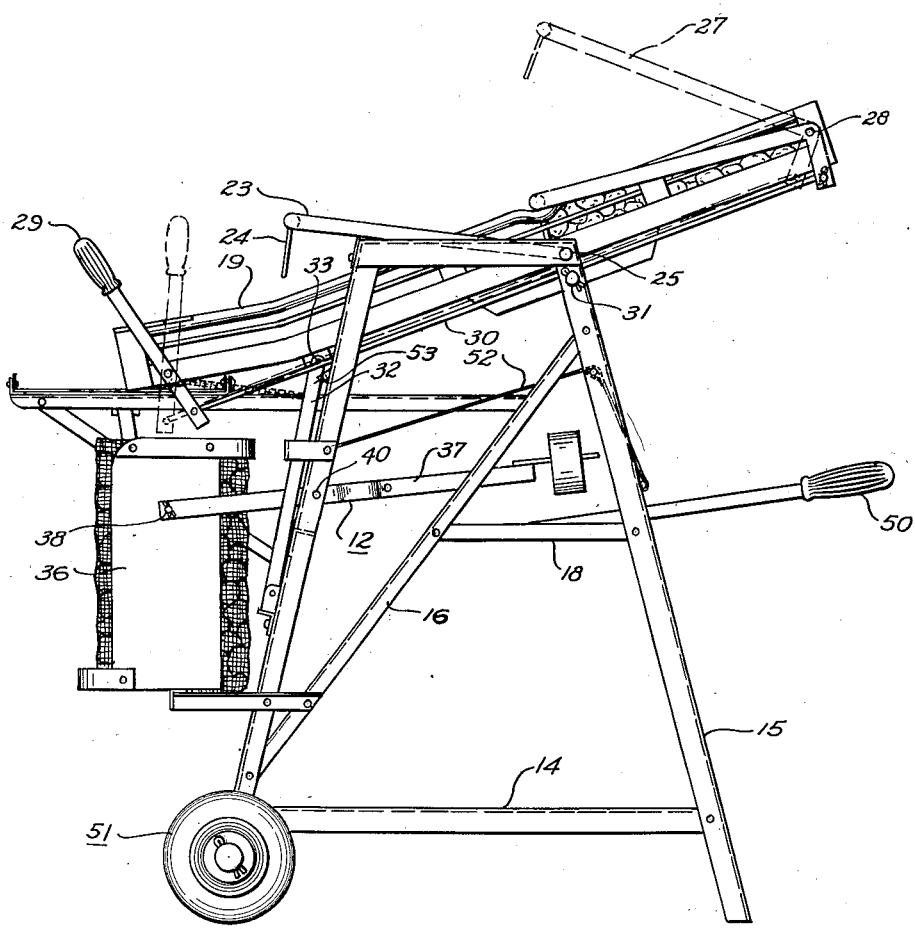
Figure 5 is a side view showing the hopper in down position, and the weighing assembly after the first section of potatoes have been discharged by gravity into the bags. It also shows the rear section of potatoes remaining for eventual discharge to other unfilled bags.
Figure 6:
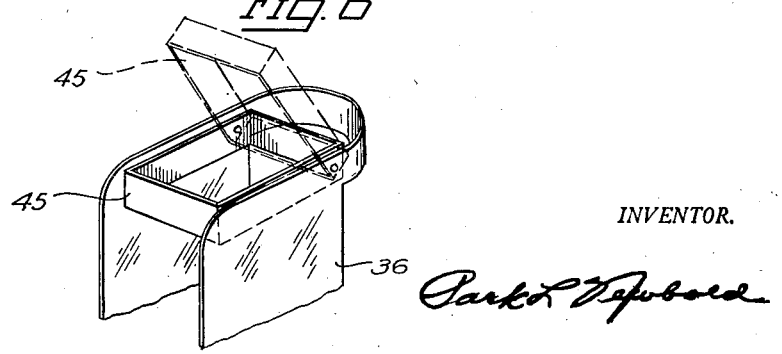
Figure 6 is a view of an adapter to be placed within the bag holders for use when using paper bags.

Referring now to the drawings a preferred embodiment of my invention includes a frame indicated generally at 10, a tilting hopper 11, and weighing assembly 12.

The frame is composed of cross members 13, side members 14, converging upright members 15, main braces 16, secondary braces 17, and auxiliary side members 18.

The hopper is composed of side members 19 formed in a manner that the forward extremities are bent upward at an angle, ends 20, a bottom 21 extending to the beginning of the upward angle, and dividers 22. The placing of these divider members 22 parallel to the side members 19 causes the hopper 11 to be divided into sections with openings in the bottom at each section's forward part. A member 23 is provided with tines 24 and pivotally connected to side members 19 at 25 and actuated by movement of the hopper 11 and contact with frame lugs at 26. Another tined member 27 is pivotally connected to the side members 19 at 28 and is operated by a handle 29 and connecting member 30. The hopper 11 is pivotally connected to the rear converging upright frame members 15 at 31, control being by a pair of arms 32 anchored to the outer ends of a horizontally placed shaft pivotally connected to the hopper at 33; these arms rest upon the cross member 39 when in up position. A hand lever 34 to which is attached a chain 35 extending around the corner and connected to one of the arms 32 produces an unlatching action from their rest on member 39 as shown in Figure 7. A spring 53 returns the handle 34 and arms 32 to normal position upon return of the hopper to up position.

The weighing assembly 12 is composed of a series of bag holding members 36 pivotally connected to forked members 37 at 38, said forked members 37 are pivotally connected to the front frame cross member 39 at 40 and have adjusting weights 41 attached to their rearward ends. These forked members 37 when in down position rest upon an auxiliary frame cross member 42. An additional auxiliary cross member 43 is provided as a rest for the bag holders 36 when in lowered position. The bag holders 36 are provided with hooks 44 for holding the bags in position within the holders, however, it is understood that other suitable means may be provided for this purpose. An adapter for use when using paper bags is shown at 45. This is placed within the upper part of the holder 36 and is pivotally connected at the position of the rearward hooks 44 and in use fits within the mouth of the bag.

An empty bag shelf is shown at 46 and is pivotally connected to member 47 at 48 and held in place by a brace 49. A pair of handles 50 are also provided for moving the machine which is equipped with wheels as shown at 51. A cover protecting the weights is shown at 52.

I have preferably constructed this machine with the hopper divided into ten sections and provided with five coordinated weighing units, however, it is understood that the novel features of my invention would be apparent with more or less sections and units.

In use the hopper 11 is placed in up position with member 27 lowered which creates five equal sections at the rear. Member 23 automatically closes thereby forming five more sections at the front. When in up position the hopper 11 rests on arms 32 contacting cross member 39.

We are assuming now that the operator is going to resack potatoes that are in 100 pound bags into 10 pound units. The potatoes are emptied into the hopper 11 and spread out evenly so that the 10 sections appear to be equal. Bags to be filled have been stacked on the table 46 and are then placed within the holders 36 and the open ends attached to the hooks 44. The operator now presses down handle 34 causing release of members 32 from their rest at 39 and lowers the hopper 11 to down position. As the hopper moves downward member 23 contacts 26 and thereby moves member 23 to a position that releases the potatoes to move by gravity through openings into the receiving bags in holders 36. When the correct weight is in the bags (having been previously set for a correct amount by the weight adjustment 41), the holder 36 moves downward and comes to rest on 43. This action causes a movement of the forked member 37 on its pivot at 40 and raises the weight 41. If all holders 36 are now resting on member 43 that indicates that the correct amounts of potatoes were accurately estimated by sight before lowering of hopper 11 and subsequent filling of the bags. Any correction of differences is obtained by the operator placing more or less potatoes in the bags.

The front sections of potatoes are now assumed to be correctly sacked, the hopper 11 has again been raised to up position, the filled bags have been removed from the holders 36 and unfilled bags again placed in their place. The operator now moves handle 29 which causes member 27 to raise, thereby releases the rear sections and proceeds as previously. The potatoes move through the front sections into the sacks, the hopper is raised to up position, member 27 lowered to closed position, and the machine is ready for a repetition of the filling operation.

I claim as my invention:

1. In a sacking and weighing machine, the combination of a frame composed of cross members, side members, braces and converging upright members, a hopper pivotally connected to the frame and composed of side members formed to an angle at their forward extremities, like parallel dividing members, end members, a bottom with openings in its forward part and so spaced that said openings are outlets from the hopper, a forward tined member pivotally connected to said hopper and actuated by movement of the same, a rearward tined member operated by a handle and connecting member, a pair of control arms pivotally connected to said hopper and operated by a hand lever, holding members pivotally attached to forked members, said forked members being fitted with adjustable weights and pivotally connected to a frame cross member, and hooks or other suitable means attached to the upper part of the holding members for securing sacks.

2. In a sacking and weighing machine the combination of a frame, a hopper pivotally connected to the frame, said hopper being constructed in a manner so chutes with openings at their forward extremities are formed, a tined forward cross member pivotally attached to the hopper and actuated by same, a tined rear cross member pivotally attached to the hopper and actuated by a lever, a pair of hopper positioning control members and a release handle for operating the control members, a series of sack holding members pivotally connected to forked members, said forked members being provided with adjusting weights and pivotally connected to a frame cross member and the holding members, said holding members being provided with suitable sack holding means at their upper extremities.

PARK L. NEWBOLD.

REFERENCES CITED

The following references are of record in the file of this patent:

UNITED STATES PATENTS

| Number | Name | Date |
| --- | --- | --- |
| 1,617,645 | Madson | Feb. 15, 1927 |
| 1,830,644 | Dietsch | Nov. 3, 1931 |
| 1,849,256 | Trovaton | Mar. 15, 1932 |
| 1,935,836 | De Vander | Nov. 21, 1933 |